United States Patent
Sontag et al.

(10) Patent No.: US 9,819,510 B2
(45) Date of Patent: Nov. 14, 2017

(54) POWER OVER DATA TRANSMISSION

(71) Applicant: THALES, Neuilly sur Seine (FR)

(72) Inventors: Yves Sontag, Le Haillan (FR); Philippe Coni, Le Haillan (FR)

(73) Assignee: THALES, Neuilly sur Seine (FR)

( * ) Notice: Subject to any disclaimer, the term of this patent is extended or adjusted under 35 U.S.C. 154(b) by 526 days.

(21) Appl. No.: 13/845,768

(22) Filed: Mar. 18, 2013

(65) Prior Publication Data

US 2014/0139014 A1  May 22, 2014

(30) Foreign Application Priority Data

Nov. 20, 2012  (FR) ................................. 12 03112

(51) Int. Cl.
*H04L 12/40* (2006.01)
*H04L 12/10* (2006.01)

(52) U.S. Cl.
CPC ........ *H04L 12/40045* (2013.01); *H04L 12/10* (2013.01)

(58) Field of Classification Search
CPC ............................. H04L 12/40045; H04K 12/10
See application file for complete search history.

(56) References Cited

U.S. PATENT DOCUMENTS

| | | | |
|---|---|---|---|
| 4,780,786 A * | 10/1988 | Weynachter et al. | 361/87 |
| 5,057,719 A * | 10/1991 | Niedra | 327/404 |
| 6,167,329 A * | 12/2000 | Engel | H02H 7/261 361/93.2 |
| 6,233,128 B1 * | 5/2001 | Spencer et al. | 361/86 |
| 6,385,024 B1 * | 5/2002 | Olson | 361/87 |
| 8,064,178 B2 * | 11/2011 | Markyvech | B60L 3/0069 361/42 |
| 8,149,683 B2 * | 4/2012 | Karam | 370/200 |
| 8,300,666 B2 * | 10/2012 | Karam et al. | 370/496 |
| 8,514,531 B1 * | 8/2013 | Zhou | H02H 7/30 361/42 |
| 8,842,403 B2 * | 9/2014 | Hummel | H02H 3/08 361/18 |
| 2005/0044431 A1 * | 2/2005 | Lang | H04L 12/10 713/300 |
| 2006/0115007 A1 * | 6/2006 | Karam et al. | 375/257 |
| 2006/0164773 A1 * | 7/2006 | Stanford et al. | 361/93.1 |
| 2006/0218418 A1 * | 9/2006 | Camagna | H04L 12/10 713/300 |

(Continued)

Primary Examiner — Thienvu Tran
Assistant Examiner — Pinping Sun
(74) Attorney, Agent, or Firm — Troutman Sanders LLP

(57) ABSTRACT

The invention relates to a power transmission device capable of transmitting electricity supplied by an electricity source to at least one powered device connected to said transmission device by means of a communication network, via at least one data transmission cable including at least one pair of conductors, the electrical current being conveyed on the at least one pair of conductors. The power transmission device according to the invention includes, for each connected powered device, a protection device capable of tripping to protect the electricity source in case of electrical malfunction of the powered device as well as balancing of the electricity conveyed on the at least one pair of conductors, said protection device including at least one shared component contributing both to performing said trip and said balancing.

9 Claims, 4 Drawing Sheets

(56) References Cited

U.S. PATENT DOCUMENTS

| | | | |
|---|---|---|---|
| 2006/0262713 A1* | 11/2006 | Karam | H04L 12/10 370/200 |
| 2007/0263675 A1* | 11/2007 | Lum | H04L 12/10 713/300 |
| 2009/0122454 A1* | 5/2009 | Gayowsky et al. | 361/103 |
| 2011/0040991 A1* | 2/2011 | Wu | 713/310 |
| 2013/0070373 A1* | 3/2013 | Jefferies | 361/31 |
| 2014/0063669 A1* | 3/2014 | Lundqvist | H02H 3/283 361/79 |

* cited by examiner

POWER OVER DATA TRANSMISSION

CROSS-REFERENCE TO RELATED CASES

The present application claims priority to French Application No. 12 03112 filed Nov. 20, 2012. This application is incorporated herein by reference in its entirety.

FIELD OF THE INVENTION

The present invention relates to an electricity transmission device capable of transmitting electricity supplied by an electricity source to at least one powered device connected to said transmission device by means of a communication network, via at least one data transmission cable including at least one pair of conductors.

The invention is situated in the field of electricity transmission on communication networks, for example such as Ethernet networks, known under the name "power over data" (PoD).

BACKGROUND

The primary interest of the power over data transmission is to simplify the cabling for equipment connected to a communication network, and to let allow it to be used without needing to connect it to an additional power source.

In particular, power over data transmission is interestingly applicable in the aeronautics field, using the same cables for electricity and data transmission making it possible to save on weight in an aircraft.

Known in particular is standard IEEE802.3af, published in June 2003, which defines an electricity ("power over Ethernet" or PoE) transmission between a source device and a plurality of powered devices, also called charges, via a connection conveying data over an Ethernet-type network. Standard IEEE802.3af defines the transmission of a DC current on an Ethernet cable, with two or four twisted pairs, capable of transmitting data packets. The power over Ethernet cable has many applications in the field of electronic equipment for the general public and various industrial fields.

The power over Ethernet technology uses transformers or coils to inject electricity into a data transmission cable. One of the constraints that must be respected in order to ensure separation of power transmission and data transmission is to balance the operation of the DC current transmitted in the two conductors of the twisted pair, also called DC balance. Standard IEEE802.3af proposes, in appendix 33 E thereof, a balance circuit that uses resistances with a high value relative to the resistance of the twisted pair used for the transmission of the current. This balance circuit is simple, but has the drawback of a significant loss of power in the resistances.

U.S. Patent application 2006/0115007 describes a method for balancing current between the currents transmitted on a twisted pair, making it possible to compensate an asymmetrical waveform of the current transmitted on the conductors of the twisted pair. This method is sophisticated and involves a large number of components, which makes the balance circuit heavier.

There is therefore a need, in particular for applications in the aeronautics field, to improve the known electricity transmission techniques using data transmission cables.

SUMMARY

To that end, according to an example, the invention proposes a power transmission device capable of transmitting electricity supplied by an electricity source to at least one powered device connected to said transmission device by means of a communication network, via at least one data transmission cable including at least one pair of conductors, the electrical current being conveyed on the at least one pair of conductors. The power transmission device is remarkable in that it includes, for each connected powered device, a protection device capable of tripping to protect the electricity source in case of electrical malfunction of the powered device as well as balancing of the electricity conveyed on the at least one pair of conductors, said protection device including at least one shared component contributing both to performing said trip and said balancing.

Advantageously, the device according to the invention makes it possible to use components of a protection device capable of performing a tripping function to balance the current in the conductors. The invention is particularly applicable in the aeronautics field, where there are high safety requirements, and it is therefore important to protect an electricity supply system by implementing a tripping function using a powered device. Thus, the invention makes it possible to simultaneously meet the safety operating and weight limit requirements of the components in an electricity transmission system on pairs of conductors capable of transmitting data.

The electricity transmission device according to the invention may have one or more of the features below, considered independently or in combination:

- the protection device also includes a monitoring module, capable of monitoring the current values passing through said conductors;
- the monitoring module is capable of communicating malfunction information to a central processing unit and receiving control orders from said central processing unit;
- the shared component is a transistor;
- the protection device includes two transistors controlled by a control circuit making it possible to balance the current on a pair of conductors and to trip as a function of a given trip curve;
- the control circuit is capable of controlling the control voltages of said transistors so as to balance the current, while ensuring that one of the two transistors is in maximum conduction operating mode;
- the transistors are field effect transistors;
- the transmission device is a switch of said communication network, connected between an electricity source and a powered device.

According to another example, the invention relates to an electricity transmission system capable of transmitting the electricity supplied by an electricity source to the at least one powered device connected to a communication network via at least one cable including at least one pair of conductors capable of conveying data, including at least two transmission devices as briefly described above to convey data and electricity to a powered device.

BRIEF DESCRIPTION OF THE DRAWINGS

Other features and advantages of the invention will emerge from the description thereof provided below, for information and non-limitingly, in reference to the appended figures, in which.

DETAILED DESCRIPTION

The invention is described as an application in the aeronautics field. The power over data transmission system will in particular be applied to transmit electricity on an Ethernet communication network of the AFDX (Avionics Full DupleX switched Ethernet) type.

Nevertheless, this application is not limiting, the principle of the invention being applicable to other types of communication networks, for example having a ring interface such as FDDI (Fiber Distributed Data Interface) or other topologies.

Figure 1:
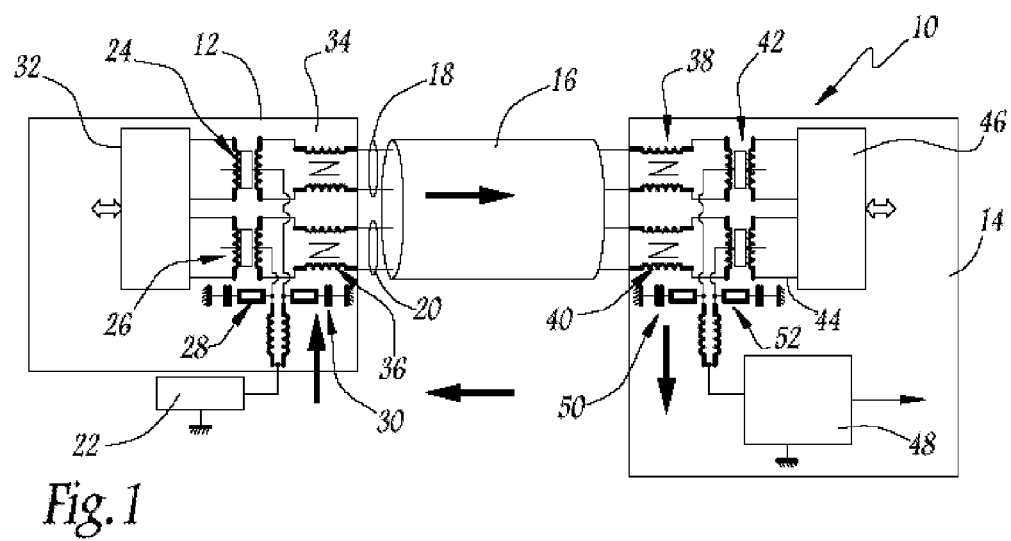
FIG. 1 is a diagrammatic example of the architecture of a power over data transmission system.

FIG. 1 diagrammatically shows a point-to-point base connection of a communication network 10 capable of transmitting electricity on a data transmission cable, similar to the system proposed in standard IEEE802.3af for PoE, with the difference that in this example, the power return is done via the ground.

The communication network 10 includes a power injection device 12 and a device 14 receiving data and power, also called PD (powered device). The devices 12 and 14 are connected via a cable 16 in this example including two twisted pairs 18, 20 of conductors sharing the same shielding.

The power injection device is for example an Ethernet switch modified to perform electricity coupling from an electricity source 22, with a 28 V DC voltage, directly on transformers 24, 26.

The transformers 24, 26 are midpoint transformers, a current input for current from the source 22 being connected on the midpoint of the secondary inductance of each of the transformers.

Terminations of the "Bob Smith" type 28, 30, also called BST terminations, are provided for each output of the power source 22. This type of termination is traditionally used in the twisted pair transmission field.

According to one alternative not shown, the power injection is done by additional inductances, similarly to what is described in the so-called "midspan" alternative of IEEE802.3af. In this alternative, midpoint inductances are added to inject power, and it is therefore not necessary to modify the Ethernet switches, which preserve standard transformers.

A signal conveying data is provided by module 32 and injected on the primary winding of each of the transformers.

At the output of each transformer 24, 26, a choke self coil 34, 36 is placed, traditionally used to block the common mode and allow the differential transmission mode to pass.

Lastly, each twisted pair 18, 20 conveys a data signal and electrical current designed to power the powered device 14.

Symmetrically, the powered device 14 includes choke coils 38, 40 at the output of the twisted pairs, midpoint transformers 42, 44, the module 46 capable of conveying the received data signal.

The electricity received is provided to an isolated DC-DC converter 48 that enables the electrical supply of the powered device 14. The Bob Smith terminations 50, 52 are similar to the terminations 28, 30 on the power injection device 12 side.

The arrows shown in FIG. 1 illustrate the flow of the electrical current, with a power return through the ground.

It should be noted that the invention also applies in the case of a PoE architecture in which the power is transmitted by one twisted pair and returns by the other twisted pair.

Figure 2:
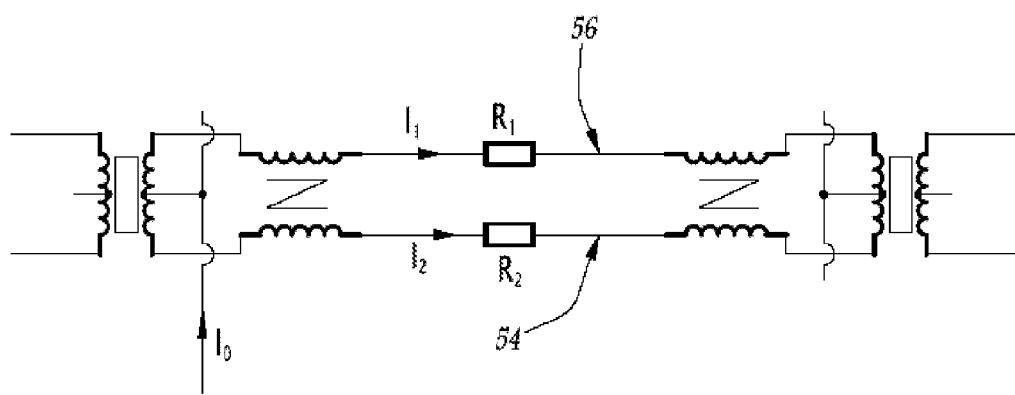
FIG. 2 is a detailed illustration of the relationship between the currents transmitted on the conductors of the twisted pair.

FIG. 2 illustrates a detail of FIG. 1, applicable for each twisted pair 18, 20, so as to explain any AC current imbalance of the conductors of the pair. A current $I_0$ is provided as input from the power source 22, the current being split into two currents $I_1$, $I_2$, conveyed on each of the conductors of the pair.

The first conductor 56 conveys the current $I_1$, the second conductor 54 conveys the current $I_2$. The respective resistances $R_1$, $R_2$, representing the sum of the resistances of the wires and the contacts of each of the conductors, are unequal, which produces an offset current $I_{offset}$. The following relationships apply, assuming that the resistance $R_2$ is greater than the resistance $R_1$:

$$I_1 = 0,5*I_0 + I_{offset}$$

$$I_2 = 0,5*I_0 - I_{offset}$$

$$I_{offset} = 0,5*(I_1 - I_2)$$

Standard IEEE802.3af provides offset current and balancing specifications for the current for PoE. A circuit with a base of high-value resistances relative to those of the twisted pair is proposed in standard IEEE802.3af to balance the currents $I_1$ and $I_2$.

As explained in more detail below in reference to FIG. 4, according to one preferred embodiment of the invention, the current balancing is done by using a field effect transistor of the MOSFET type, where of the resistance $R_{Dson}$ is modulated so as to balance the currents of the twisted pair, in order to decrease the bulk and weight of the inductive components of the transformers 24, 26, 42 and 44.

In one power over data application in the aeronautics field, it is important, in order to meet safety standards, to ensure redundancy, both for the data transmission and electricity transmission.

The invention applies with various types of communication networks: linear bus network of type 1553, router and switch-based network of the Ethernet type, ring topology network of the FDDI type. More generally, the invention may apply to most networks, provided that the encoding of the data is DC balanced.

Figure 3:
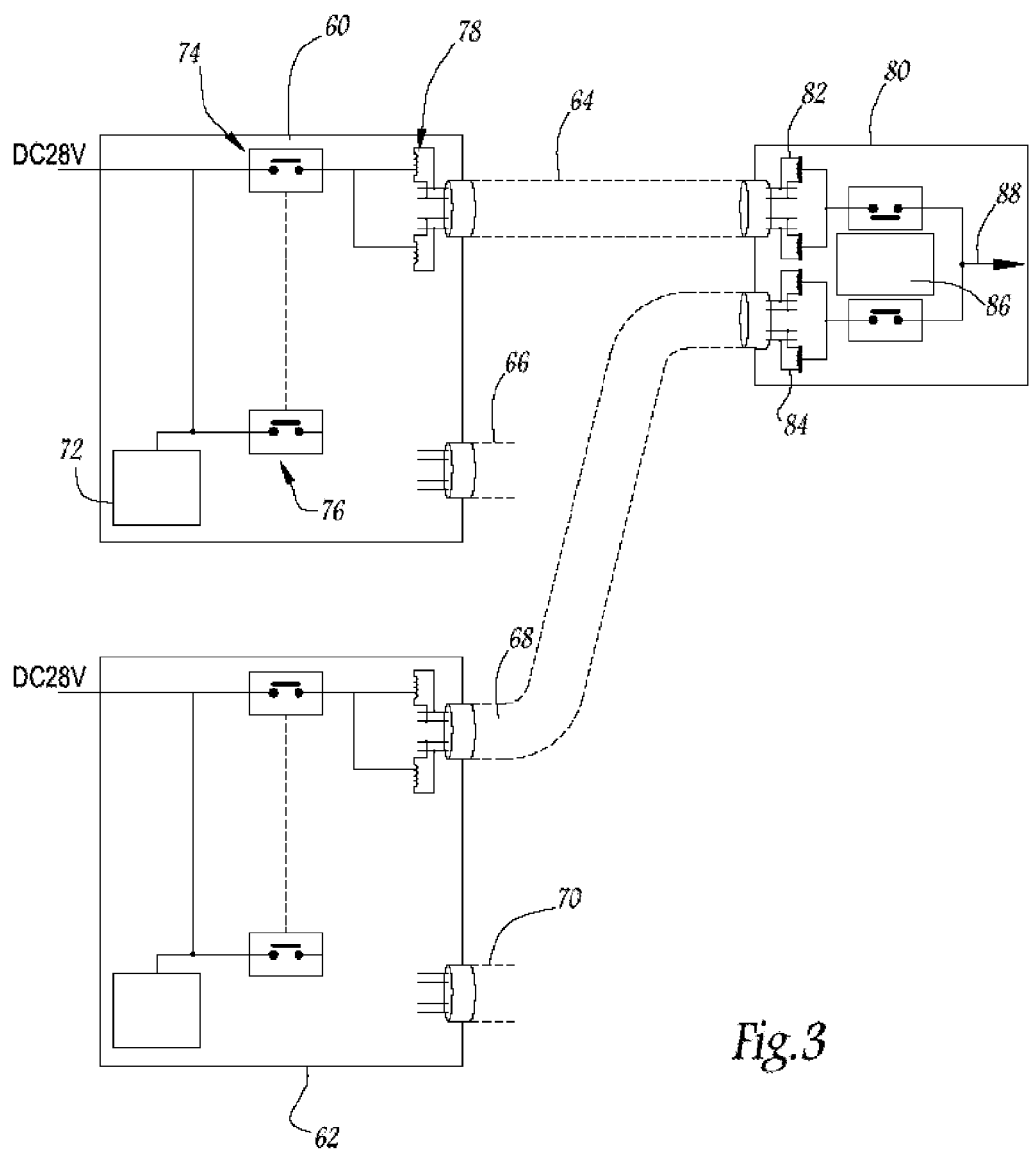
FIG. 3 illustrates an alternative architecture of a power and data transmission system, including a tripping device associated with each power and data transmission cable.

FIG. 3 illustrates an architecture in which two switches 60, 62, of the Ethernet switch type modified to perform the electricity transmission, power a same powered device, thereby ensuring current and data transmission redundancy. Only one powered device is shown in that figure, with the understanding that any number of powered devices is possible.

The switches 60, 62 each include an arrangement similar to that explained in reference to the power injection device 12 of FIG. 1, making it possible to convey data and electricity on the respective cables 64, 66, 68 and 70, which are shielded cables with two twisted pairs in this example embodiment.

The two switches 60, 62 being similar, only one of the two switches is described in detail here. The switch 60 comprises a power supply module 72, and a plurality of tripping devices 74, 76, or circuit breakers, capable of performing a tripping function by output cable of the switch in order to protect the power source, denoted DC28V in the example of FIG. 3. The circuit breakers are electronic switch components of the SSPC (solid-state protection circuit) type, based on transistors, for example based on MOSFET field effect transistors. Alternatively, other types of transistors can be used. Such a circuit breaker is characterized by a trip curve, determined to protect the cables and react to electric arcs in the case of poor isolation.

The circuit breaker 74 is connected to an inductive injection circuit 78 similar to the transformer and self choke coil assembly, respectively referenced 24 and 34 in FIG. 1, allowing the injection of power and data on the cable 64.

The powered device 80 receives data and electricity on the one hand from the transmission cables 64, making it possible to connect the powered device 80 to the switch 60, and on the other hand from the transmission cables 68, making it possible to connect the powered device 80 to the switch 62.

According to one alternative, the cable 64 only conveys data and the cable 68 conveys electricity, so as to completely decorrelate the supply of data from the supply of electricity and maximize the availability of data and power.

The powered device 80 includes circuits 82, 84 similar to the inductive circuit 78, a module 86 capable of performing source switching between the power supplies respectively conveyed by the cables 64, 68. The powered device 80 is powered by the electricity 88 conveyed on the transmission cables 64 or 68, owing to that switch 86.

Figure 4:
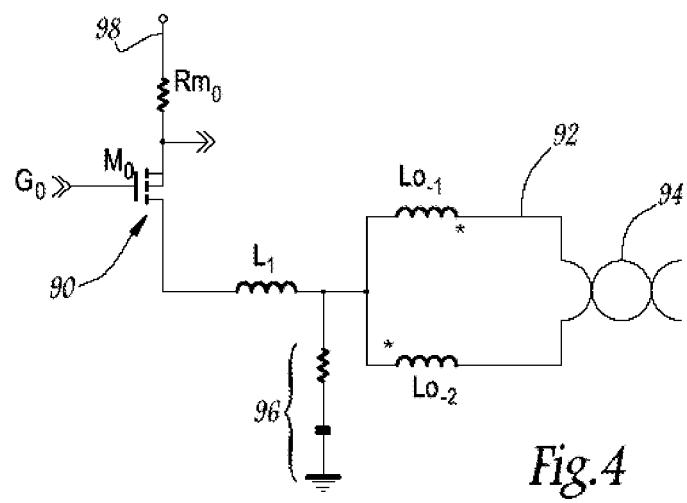
FIG. 4 shows an example of a connection between a tripping device and the power injection circuit.

FIG. 4 illustrates, in more detail, the coupling between the transistor ($M_0$) 90 of a circuit breaker, for example the circuit breaker 74 of FIG. 3, and the inductive injection circuit referenced 78 in FIG. 3, including an injection transformer L0 in two parts L0_1 and L0_2, referenced 92, capable of injecting a current into the twisted pair 94. The gate of the transistor 90 is controlled by a desired trip curve, making it possible to put the transistor either in the on state or the off state, by controlling the voltage $V_{GS}$ of that transistor.

The inductive injection circuit also comprises an inductance L1 connected, on the one hand, to the "source" output of the transistor 90, and on the other hand to the transformer L0. A termination of the BST (Bob Smith Termination) type 96, including a resistance serially connected to a capacitance, is connected to the ground. The inductance L1 for example has a value of 10 µH to preserve the effectiveness of the BST termination 96. A resistance $Rm_0$ is used to measure the current on the wire 98 connected to the drain of the transistor 90.

The transistor 90 illustrated is a P channel MOSFET transistor. Alternatively, by applying the same principle, an N channel MOSFET transistor can be used, such a transistor being advantageous because the resistance $R_{DSon}$ is lower with an equal semiconductor surface, but nevertheless requires a more complicated gate command.

Figure 5:
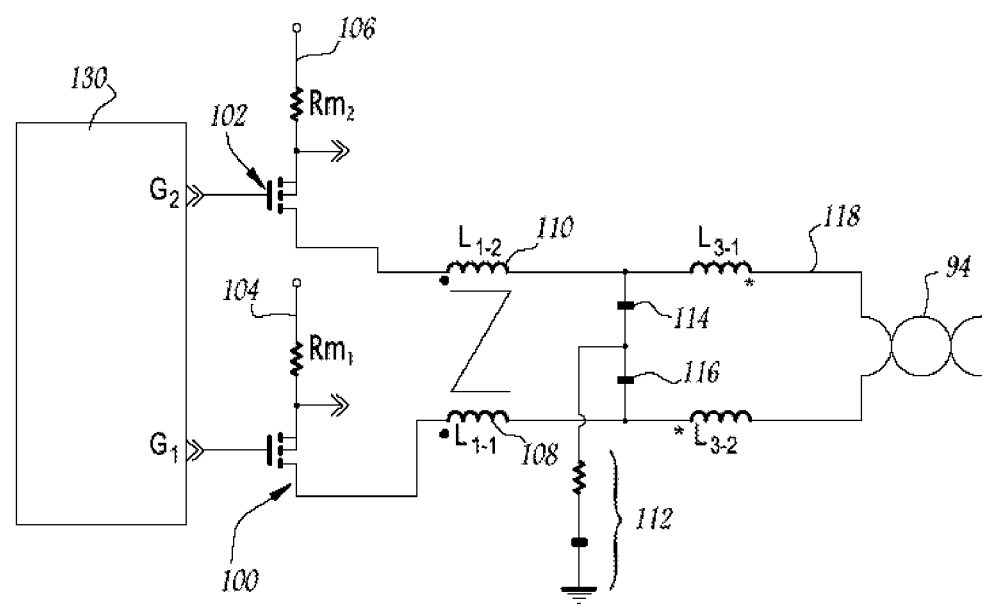
FIG. 5 illustrates part of a protection device according to examples of the invention performing a tripping and current balancing function according to the invention.

In one preferred embodiment of the invention, illustrated in FIG. 5, two transistors $M_1$, $M_2$ of the MOSFET type are used in place of a single transistor $M_0$, respectively denoted 100 and 102 in FIG. 5. The current measuring resistance $Rm_0$ is split into two measuring resistances respectively denoted $Rm_1$ and $Rm_2$ making it possible to measure the currents on the wires 104, 106, respectively.

The inductance L1 is separated into two inductances L1_1 and L1_2, referenced 108 and 110 in the figure. A BST termination 112 is present. Two capacitive components 114 and 116 are added between the two inductances denoted L3_1 and L3_2 of the PoD transformer or the injection coil 118. The capacitive components 114, 116 are capacitors with a high enough value that, in the frequency band of the signal, they form the equivalent of a short-circuit. It should be noted that the overall current passing through the inductances L1_1 and L1_2 is the same as the current passing through the inductance L1 of FIG. 4, as a result of which the transistors 100 and 102, the associated resistances $Rm_1$ and $Rm_2$ will respectively have an individual dimension two times smaller than the transistor 90 and the resistance $Rm_0$.

The two transistors 100 and 102 of FIG. 5 perform the tripping function as the single transistor 90 of FIG. 4 would have done. It is preferable for the tripping function to be unique so as to avoid passing current in only one of the wires of the pair. In case of trip, the two transistors 100 and 102 are placed in an open circuit ("OFF" state) simultaneously. Furthermore, the current balancing function is performed, in the conductor operation of the transistors 100, 102, by modulating the value RDSon of one of the two transistors. Thus, the transistors 100, 102 are components that contribute both to the tripping function and the balancing function.

Figure 6:
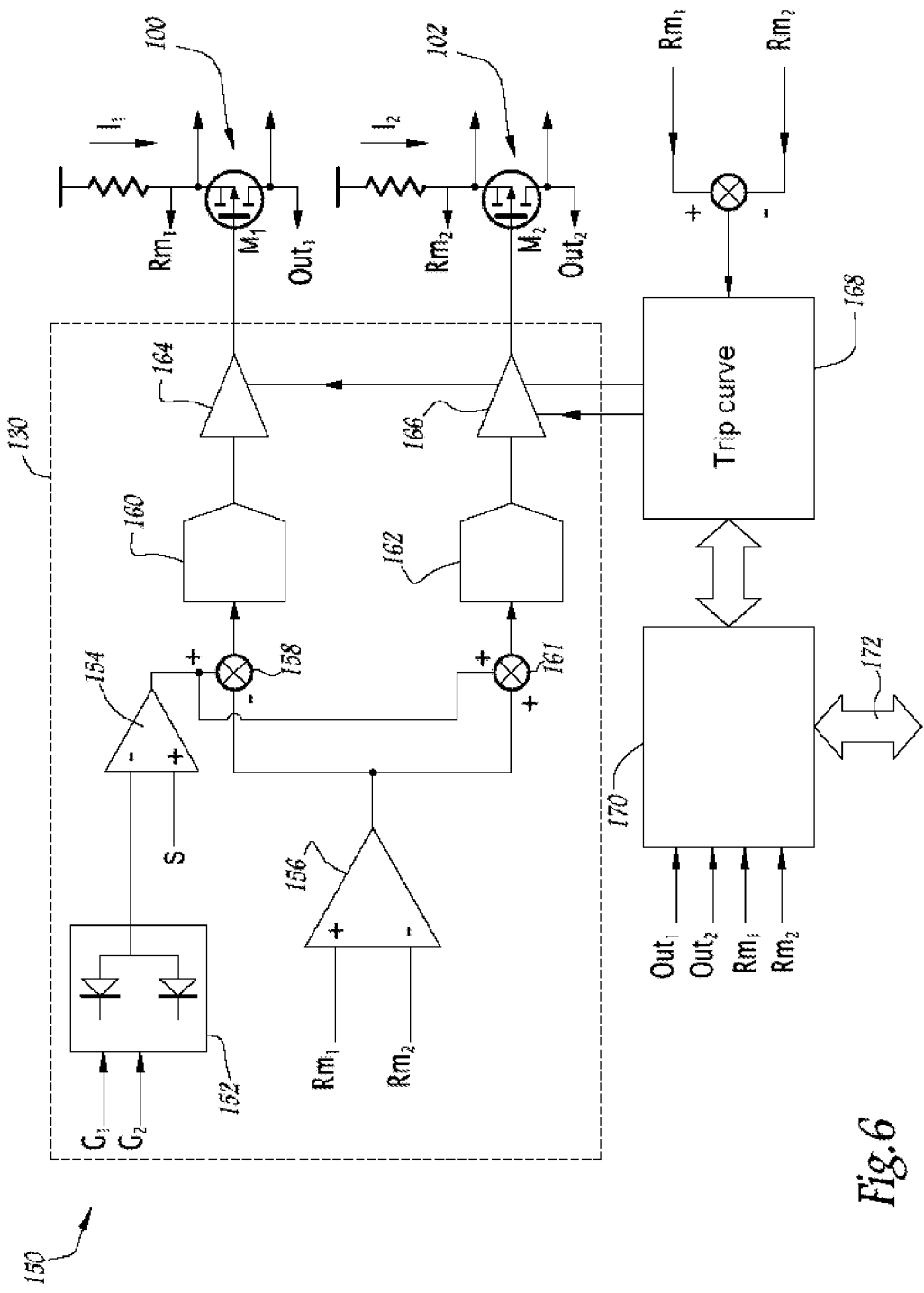
FIG. 6 illustrates an example of the device performing a tripping and current balancing function according to the invention.

The transistors 100, 102 are controlled by a control circuit 130, shown in more detail hereafter in FIG. 6.

FIG. 6 illustrates a summary of the main protection device 150 according to one preferred embodiment of the invention, so as to perform a tripping function, the current balancing function, and a monitoring function making it possible to measure the current in each wire of the twisted pair. In particular, the control circuit 130 is outlined here. The control circuit 130 of the protection device 150 comprises, to control the transistors 100, 102, a module 152 making it possible to obtain the minimum between the voltages G1 and G2, corresponding to the maximum between the respective voltages $V_{GS}$ of the transistors 100 and 102, which is then compared to a threshold S by an amplifier 154. The threshold S corresponds to the voltage $V_{GS\_on}$, which is the rated voltage $V_{GS}$ for the "ON" operating state of the transistor from which the value of $R_{Dson}$ no longer varies significantly. For example, for traditional MOSFET, the value of $V_{GS\_on}$ is comprised between 10 V and 12 V.

The current balancing on the conductors of the twisted pair is done by feedback loops. The resistances $Rm_1$ and $Rm_2$ are used to measure the respective currents $I_1$ and $I_2$ conveyed by the two conductors of the twisted pair, as illustrated in the figure. It should be noted that the useful current $I_0 = I_1 + I_2$ is in the vicinity of several amperes in rated operation, but higher when the powered device is started up. The offset current that needs to be eliminated is approximately several dozen milliamperes. The resistances $Rm_1$ and $Rm_2$ are in the vicinity of several dozen milliohms to minimize the voltage drop. Preferably, the measuring resistances $Rm_1$ and $Rm_2$ are matched, therefore manufactured on the same substrate, so as to provide better measuring precision.

A differential amplifier 156, which is preferably based on the "chopper amplifier" technique so as to have greater precision (very low offset voltage), receives, as input, the measured voltages corresponding to the currents $I_1$ and $I_2$. In a first feedback loop, the output of the amplifier 156 is combined by a subtracter 158 with the output of the amplifier 154, and the combined signal is sent to an integrator 160. If the current $I_1$ is greater than the current $I_2$, the output of the amplifier 156 will decrease, and the gate potential G1 of the transistor $M_1$ 100 will increase, reducing the voltage $V_{GS1}$ of that transistor.

In a dual manner, in a second feedback loop, the output of the amplifier 156 is added to the output of the amplifier 154 by an adder 161, and the result is integrated by an integrator 162. Thus, if the current $I_1$ is greater than the current $I_2$, the output potential of the integrator 162 decreases, which results in increasing the current passing through the transistor 102.

At the output of the integrators 160, 162, respective switch on-off circuits 164, 166, which are controlled by a trip curve 168, make it possible to perform the tripping function of the protection device 150. Various implementations of switch on-off circuits 164, 166 can be considered.

Thus, the tripping and current balancing functions are performed by the components of the protection device 150. The embodiment illustrated in FIG. 6 also makes it possible to ensure that one of the two transistors 100, 102 operates at maximal conduction, therefore the value of $R_{Dson}$ of that transistor is minimal, so as to obtain optimal operation in terms of consumed power. This is done by using a module 152 combined with the amplifier 154, which makes it possible to control the lowest of the gate potentials to obtain a voltage $V_{GS\_on}$ on one of the two transistors, the voltage $V_{GS\_on}$ being, as mentioned above, that from which the value of $R_{Dson}$ of the transistor no longer varies substantially.

Thus, one of the two transistors is an optimal conduction operation at $V_{GS\_on}$ while the value of $R_{Dson}$ of the other transistor is monitored for balancing of the currents by means of feedback loops.

Furthermore, a monitoring module 170 uses, as input, the measured values of voltages measured at the points denoted "Out1," "Out2," corresponding to the respective voltages $V_{DS}$ of the transistors and the points $Rm_1$, $Rm_2$, making it possible to measure the currents $I_1$, $I_2$.

The monitoring module 170 can be made with analog components or digital components, for example a microcontroller, FPGA with ADCs, ASIC, or combination of the two.

In one embodiment, the monitoring module 170 communicates by a communication bus 172 with a central processing unit, not shown, which is part of a network switch integrating the protection device 150. The monitoring module 170 is capable of monitoring the currents $I_1$, $I_2$, and the frequency or significance of the imbalances observed. In this way, it is then possible to cut the power if there is a malfunction on one of the conductors of the twisted pair (for example, cut wire), so as to avoid heating. Furthermore, the malfunction may be indicated and an alert provided, using discretely-timed signals transmitted on the communication bus. In return, the monitoring module 170 is capable of receiving control orders, for example trip orders, sent to the central processing unit by means of discretely-timed signals on the communication bus 172.

The monitoring module 170 can also monitor the drain voltages $V_{DS}$ of the transistors 100, 102, measured on "Out 1" and "Out 2." In the case where the voltage $V_{DS}$ is too high, an anomaly in the corresponding transistor can be detected.

It should be noted that the invention has been described in the case of power transmission on a pair of conductors. In the case where it is considered to apply the power transmission over several pairs of conductors, it is preferable to perform a current balancing function by pair of conductors, but the tripping and monitoring functions for all of the pairs conveying current and data to a same powered device.

Advantageously, the device according to the invention makes it possible to use shared components to perform the tripping and current balancing functions of the conductors, thereby making it possible to meet both operating safety and weight limitation requirements of the components in a power over data system on pairs of conductors capable of transmitting data.

The invention claimed is:

1. A power transmission device capable of transmitting electricity supplied by an electricity source to at least one powered device connected to the transmission device by means of a communication network, via at least one data transmission cable comprising
    at least one twisted pair of conductors, the electrical current being conveyed on the at least one twisted pair of conductors,
    wherein the power transmission device comprises, for each connected powered device, a protection device capable of tripping as a function of a given trip curve to protect the electricity source in case of electrical malfunction of the powered device as well as balancing of the electricity conveyed on the at least one twisted pair of conductors to make the current of the first conductor equal to the current of the second conductor of the same twisted pair of conductors pursuant to Standard IEEE802.3af, and
    wherein the protection device comprises at least one shared transistor connected to an inductive injection circuit, the transistor contributing to both performing the trip and the balancing of the electricity conveyed on the at least one twisted pair of conductors.

2. The device according to claim 1, wherein the protection device further comprises a monitoring module, capable of monitoring the current values passing through said conductors.

3. The device according to claim 2, wherein the monitoring module is capable of communicating malfunction information to a central processing unit and receiving control orders from the central processing unit.

4. The device according to claim 1, wherein the protection device further comprises two transistors controlled by a control circuit making it possible to balance the current on a twisted pair of conductors and to trip as a function of a according to the given trip curve.

5. The device according to claim 4, wherein the control circuit is capable of controlling the control voltages of the transistors so as to balance the current, while ensuring that one of the two transistors is in a maximum conduction operating mode.

6. The device according to claim 4, wherein the transistors are field effect transistors.

7. The device according to claim 1, wherein the device is a switch of the communication network, connected between the electricity source and the powered device.

8. An electricity transmission system capable of transmitting the electricity supplied by an electricity source to the at least one powered device connected to a communication network via at least one cable including at least one twisted pair of conductors capable of conveying data, including at least two transmission devices according to claim 1 connected to the same powered device by means of the communication network and each capable of conveying data and electricity to the powered device.

9. A power transmission device capable of transmitting electricity supplied by an electricity source to at least one powered device connected to the transmission device by means of a communication network, via at least one data transmission cable comprising:
- at least one twisted pair of conductors, the electrical current being conveyed on the at least one twisted pair of conductors,
- wherein the power transmission device comprises, for each connected powered device,
  - a protection device capable of tripping to protect the electricity source in case of electrical malfunction of the powered device,
  - wherein the protection device further being adapted to balance the electricity conveyed on the at least one twisted pair of conductors to make the current of the first conductor equal to the current of the second conductor of the same twisted pair of conductors pursuant to Standard IEEE802.3af,
  - wherein the protection device comprises a circuit breaker comprising at least one transistor connected to an inductive injection circuit adapted to inject electricity into at least one twisted pair of conductors,
  - wherein the inductive injection circuit comprises at least one injection transformer in two parts, capable of injecting current into the at least one twisted pair, and
  - wherein the transistor contributing to both performing the trip and the balancing of the electricity conveyed on the at least one twisted pair of conductors.

* * * * *